(12) United States Patent
Wheeler et al.

(10) Patent No.: US 7,242,932 B2
(45) Date of Patent: Jul. 10, 2007

(54) MOBILE INTERNET PROTOCOL ON A SIGNALING CHANNEL

(75) Inventors: Jill C. Wheeler, Gilbert, AZ (US);
William T. Scott, Chandler, AZ (US);
Karina Burchard, Cave Creek, AZ (US); Soon Teck Gibson Ang, Nashua, NH (US)

(73) Assignee: Motorola, Inc., Schaumburg, IL (US)

( * ) Notice: Subject to any disclaimer, the term of this patent is extended or adjusted under 35 U.S.C. 154(b) by 556 days.

(21) Appl. No.: 10/258,723

(22) PCT Filed: Apr. 26, 2001

(86) PCT No.: PCT/US01/13611

§ 371 (c)(1),
(2), (4) Date: Oct. 25, 2002

(87) PCT Pub. No.: WO01/89157

PCT Pub. Date: Nov. 22, 2001

(65) Prior Publication Data
US 2004/0002337 A1 Jan. 1, 2004

Related U.S. Application Data

(60) Provisional application No. 60/205,177, filed on May 17, 2000.

(51) Int. Cl.
*H04Q 7/20* (2006.01)
*H04M 1/00* (2006.01)

(52) U.S. Cl. .................. 455/435.1; 455/436; 455/445; 455/550.1

(58) Field of Classification Search ............. 455/435.1, 455/435.2, 436, 439, 445, 433, 434, 458, 455/466, 550.1, 560, 561, 95, 575.1
See application file for complete search history.

(56) References Cited

U.S. PATENT DOCUMENTS

| | | | |
|---|---|---|---|
| 5,572,528 A | 11/1996 | Shuen | |
| 5,708,655 A | 1/1998 | Toth et al. | |
| 5,793,762 A | 8/1998 | Penners et al. | |
| 6,466,556 B1 * | 10/2002 | Boudreaux | 370/331 |
| 6,608,832 B2 * | 8/2003 | Forslow | 370/353 |
| 6,683,881 B1 * | 1/2004 | Mijares et al. | 370/401 |
| 6,711,166 B1 * | 3/2004 | Amir et al. | 370/395.1 |
| 6,728,365 B1 * | 4/2004 | Li et al. | 379/329 |
| 6,731,617 B1 * | 5/2004 | Mizell et al. | 370/328 |

FOREIGN PATENT DOCUMENTS

| | | |
|---|---|---|
| WO | WO 99/56445 | 11/1999 |
| WO | WO 99/67928 | 12/1999 |
| WO | WO 01/31859 A1 | 5/2001 |

OTHER PUBLICATIONS

"3rd Generation Partnership Project; Technical Specification Group Services and System Aspects; Combined GSM and MobileIP Mobility Handling in UMTS IP CN", 3GTR23.923 version 1.0.0, XP002203015, Oct. 6, 1999, pp. 1-73.

* cited by examiner

*Primary Examiner*—Tony T. Nguyen

(57) ABSTRACT

A mobile internet protocol on a radio signaling channel (2). A mobile internet protocol message is wrapped in a radio control message (12) by a mobile station (1) and sent to a radio access network (3). The mobile internet protocol message is unwrapped by the radio access network and routed to a home agent (7) for authentication.

15 Claims, 3 Drawing Sheets

MOBILE INTERNET PROTOCOL ON A SIGNALING CHANNEL

REFERENCE TO RELATED APPLICATIONS

This Application claims the benefit of U.S. Provisional Application No. 60/205,177 filed on May 17, 2000.

BACKGROUND OF THE INVENTION

The present invention pertains to telecommunications and more particularly to transferring mobile internet messages via wireless signaling channels.

Today cellular service providers are adding data service capabilities to mobile devices. Currently, when data service capabilities are added to mobile devices, the provider is forced to utilize several levels of authentication.

Currently, for internet service providers to provide mobile internet protocol, such mobile internet protocol registrations are sent on a radio bearer traffic channel. Current 2.5 and $3^{rd}$ generation standards propose such a solution. This solution requires two forms of authentication of the mobile unit. Further, this solution requires two forms of network access, namely one network access to a wireless network and another access to the mobile internet protocol network.

This solution results in increased connection time setups and increased messaging. Further, the solution requires entities to either buy their own HSP/AuC or dual provision their customers in a wireless provider's HSP.

What is needed is an arrangement for allowing internet service providers and IP players to provide mobile internet services to their customers at a low start-up fee without requiring dual provisioning of subscribers. In addition, what is needed is a more efficient method of implementing mobile internet protocol on wireless networks to perform authentication and access a single time.

DESCRIPTION OF THE PREFERRED EMBODIMENT

Figure 1:
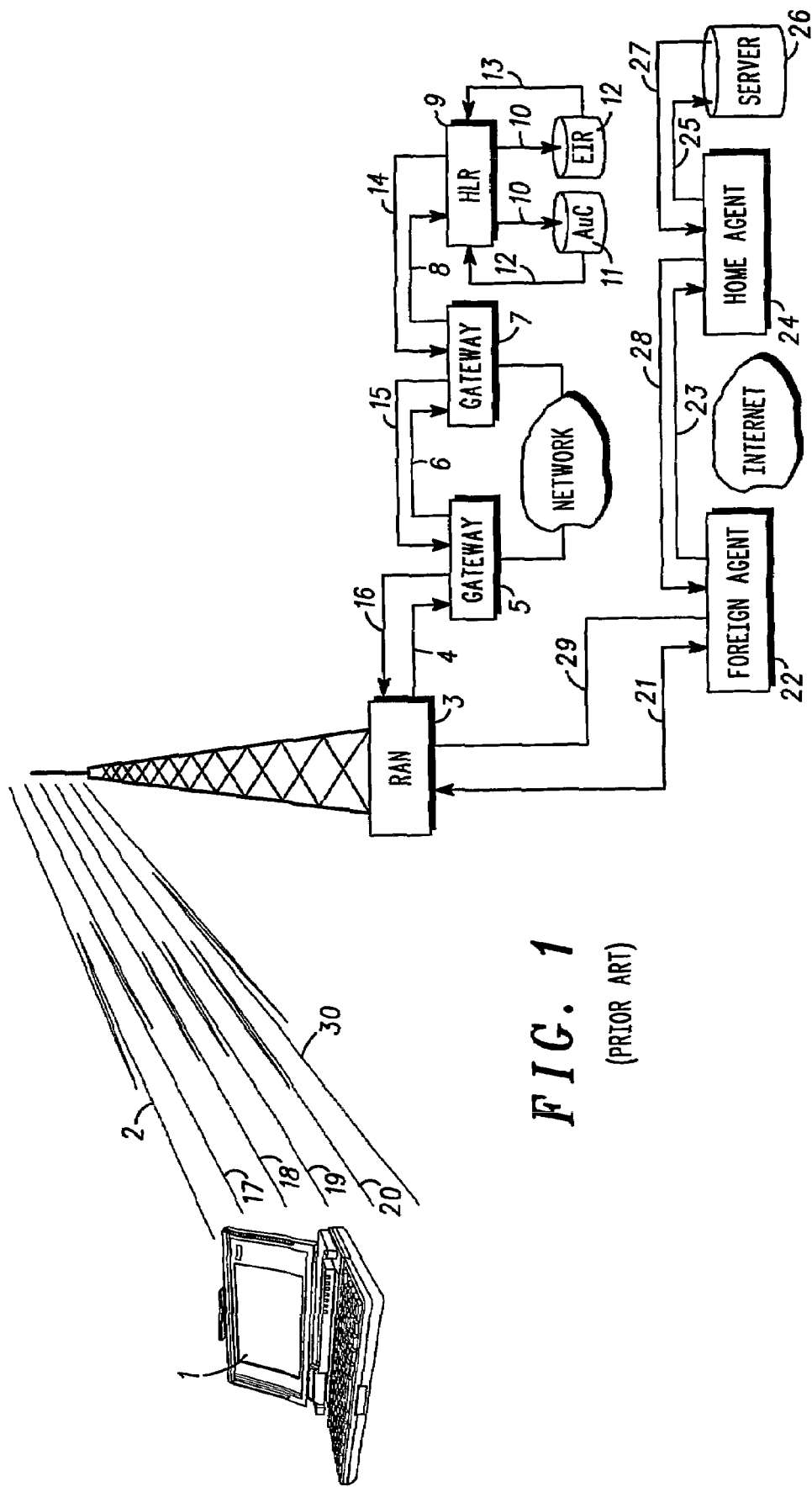
FIG. 1 is a block diagram of a prior art arrangement for providing mobile internet protocol.

FIG. 1 illustrates a two level authentication system according to the prior art. Referring again to FIG. 1, the mobile device (1) sends a registration request (2) to the Radio Access Network (RAN) (3) in a visited network over a control channel. The RAN forwards the message (4) to its SS7 gateway (5) and the visited SS7 gateway forwards the message to the Mobile Station's home network SS7 gateway (7) which forwards the message (8) to the Home Location Register (HLR) The HLR either queries the Authentication Center (AuC) (11) or the Equipment Identity Register (10) for authentication, the choice of which is based on the content of the request (10).

Depending on the response of the query (12), the HLR (9) forwards the response back to the visited network through a path from the home and visited SS7 (14 through 16). The response forwarded by the HLR (9) back to the visited network is then used by the RAN to grant the Mobile Station (MS) access to the network. The response is subsequently passed back to the MS over the control channel (17).

Once the MS has access to the network, the MS will request bandwidth (18) and the RAN issues bandwidth (19). The MS uses the bandwidth to issue a Mobile IP registration request containing a care of address over a bearer channel (20). The visited network passes the request (21) to the Foreign Agent (22), which communicates with a Home Agent (24) in the home network of the MS through the Internet (23). The Home Agent (HA) verifies the request (25) using a standard protocol such as an Authentication, Authorization and Accounting (AAA) server (See IETF http://www.ietf.org/html.charters/aaa-charter.html) (26). Based on the AAA server's response (27), the Home Agent either accepts or denies the request in a response back to the Foreign Agent (22). Based on the response (28), the Foreign Agent grants or denies the MS access to the internet, and notifies the MS by passing the response back to the MS through the network (29 and 30).

1.1. Technical Summary including Problems and Deficiencies of Current Solution

As may be appreciated from the foregoing description of the two level authentication process, the home network must either have, or have the support of, an SS7 gateway, HLR, AuC and EIR as well as a Home Agent and a AAA server. Further, two sets of redundant messaging must be transmitted during authentication. In addition, two access messaging procedures are performed and two authentication procedures are performed: one for the radio network and one for the Mobile IP network. This unnecessarily increases the connection setup time.

In order for an ISP to provide mobile packet data services in this environment, the ISP must provision its subscribers in a cellular operator's HLR. This forces the ISP to perform dual provisioning of the subscriber (in its own subscriber database as well as in an HLR). Dual provisioning is error prone and requires complex management of data. Further, the ISP no longer has total control of the subscriber profiles and information.

1.2. Overview

Figure 2:
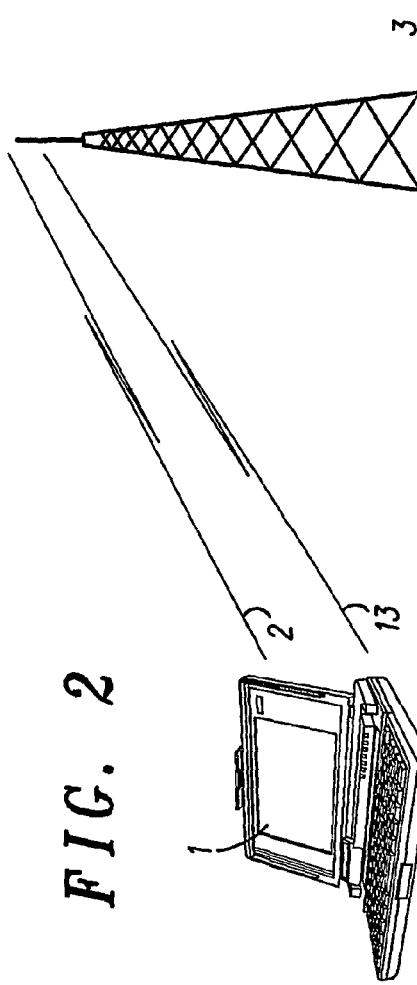
FIG. 2 is a block diagram of an arrangement for providing mobile internet protocol in accordance with the present invention.

An overview illustration of a preferred embodiment of the present invention is given in FIG. 2. FIG. 2 illustrates mobile IP on the radio signaling channel according to a preferred embodiment of the present invention. The MS (1) sends the Mobile IP request over the control channel (2) to the Radio Access Network (3). The RAN forwards the message (4) to the Foreign Agent (5). The Foreign Agent communicates (6) with a Home Agent (7) in the Mobile Station's home network. The Home Agent makes an authentication request (8) of the AAA server (9). Based on the response (10), the Home Agent responds back to the Foreign Agent (11) as to the legitimacy of the MS. Based on the response, the Foreign Agent grants or denies the MS access to the network and relays the response back the MS through the network (12 and 13). This substantially reduces hardware requirements as well as messaging overhead.

Security services can be handled in a number of ways; the AAA server is used as an example. At a minimum, authentication and access need to be performed; encryption may also be added if the ISP and cellular operator deem it appropriate. Also note that this preferred embodiment can be utilized not only by the ISP, but by the corporation or any other entity wishing to provide mobile IP data services to their subscribers/users.

1.3. Mobile Station Functions

The Mobile Station (MS) can be a typical 2.5G or 3G handset. Preferably, the handset should either: automatically recognize it is in a system that supports Mobile IP on the radio signaling channel as subsequently discussed in broadcast channel subsection; or recognize a command triggered by the user of the handset (i.e. the user knows the system supports Mobile IP on the radio signaling channel and indicates this to the MS in some fashion). Thus, the MS can function as a regular 2.5G/3G handset or it can function in Mobile IP signaling mode. This enables manufacturers of handsets to download a simple software patch to their existing handsets. Of course this doesn't preclude the MS from being designed to specifically run in an environment that only supports Mobile IP signaling.

The MS performs the following functions in supporting Mobile IP on the signaling channel:

Bypass the radio access attach function, which is specific to the radio access network.

Bypass the operator network authentication.

Send Mobile IP registration message rather than the typical network service request message.

Recognize the handoff command from the Foreign Agent (via the RAN) when Foreign Agent to Foreign Agent handoff is necessary.

If the MS is also a 2.5G/3G handset and can be used alternatively in a 2G, 2.5G and or a 3G network, the MS is preferably capable of switching between Mobile IP signaling and 2G, 2.5G and or 3G signaling. In this case, the MS stores separate identities and authentication material for the Mobile IP signaling networks and the 2G, 2.5G and or 3G networks. In the Mobile IP signaling network, the MS identity information is controlled by the owner of the subscriber database that is accessed by the Home Agent. In the 2G, 2.5G and or 3G network, the owner of the Home Location Register controls the MS identity(s).

Figure 3:
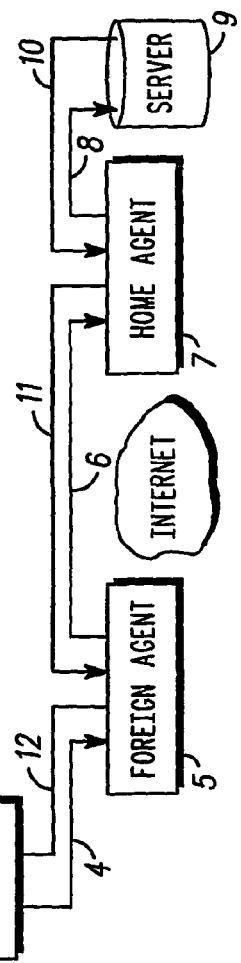
FIG. 3 is a layout diagram of data storage for providing mobile internet protocol in accordance with the present invention.

FIG. 3 provides a comparison of the data that can be provisioned and stored on the MS according to a preferred embodiment of the present invention and the prior art. So, the MS will store at least two sets of identity data as shown in FIG. 3, or alternatively is capable of receiving multiple sets of identity information from external smart cards, chips etc. If the storage is on the MS, the MS is configed with a provisioning option that enables it to distinguish between Mobile IP specific provisioning data and typical provisioning data. This option can be a selection item in a menu driven interface; a toggle bit or byte in a stream of provisioning data (to identify the type of network) etc.

1.4. Foreign Agent Functions

Figure 4:
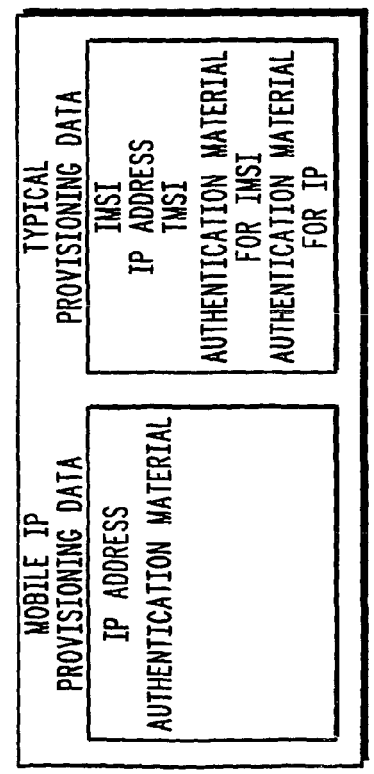
FIG. 4 is a layout diagram of neighbor list for providing mobile internet protocol in accordance with the present invention.

FIG. 4 illustrates the Foreign Agent neighbor list according to a preferred embodiment of the present invention. The Foreign Agent performs the following:

Send and receive binding update and response messages from other Foreign Agents

Send and receive relocation request messages to and from RANs (Radio Access Networks)

Maintain a neighbor list of other Foreign Agents mapped to Base Stations, radio network controllers and or mobility management controllers that are in said Foreign Agents' networks (see FIG. 4).

Send messages to the radio access network which trigger setup, handoff and teardown of radio access bearer channels.

Tally number of packets outgoing and incoming per MS

Perform Billing functions

The Foreign Agent neighbor list is presented in FIG. 4. The list stores the date used by the Foreign Agent to identify the correct Foreign Agent for handoff. When the radio network is requesting a handoff, the radio network forwards the appropriate information (e.g., Base Station ID, radio network controller ID, mobility management controller ID etc.), to the Foreign Agent.

If Mobile IP version 6 is supported in the Mobile Station and the radio network, the Foreign Agent is not required. This preferred embodiment works well with Mobile IP version 6, provided the following functions are supported by the radio network:

Setup, handoff and teardown of radio access channels based on Mobile IP signaling messages and or expiration of timers.

Tally of usage per MS

Mobile IP version 6 is an IETF draft that can be located on the internet at: http://www.ietf.org/internet-drafts/draft-ietf-mobileip-ipv6–12.txt.

1.5. Hom Agent Functions

The Home Agent performs the following:

A lookup operation in a subscriber database for authentication and registration information (for example, an ISP subscriber database).

1.6. Base Station Broadcast Channel

In one alternate embodiment, the broadcast channel may have (unused) fields that can be used at the vendor's discretion. If this is the case, then one of the unused fields may be used in the broadcast channel to indicate to the MS that the network supports Mobile IP on the signaling channel.

1.7. Radio Access Network (RAN) Functions

The RAN performs the following functions:

Route MIP registration messages (previously encapsulated in RRC messages) to the Foreign Agent Initiate Bearer Setup Procedure upon receipt of Mobile IP Registration Response from Foreign Agent Initiate Bearer Release Procedure upon receipt of Radio Access Bearer release message from Foreign Agent Send relocation required message to Foreign Agent upon receipt of update routing area request, signal strength indicator, or handoff request from the MS.

Send RRC: Handover to UTRAN command to the MS upon receipt of a relocation request message from the Foreign Agent.

1.8. Registration

Figure 5:
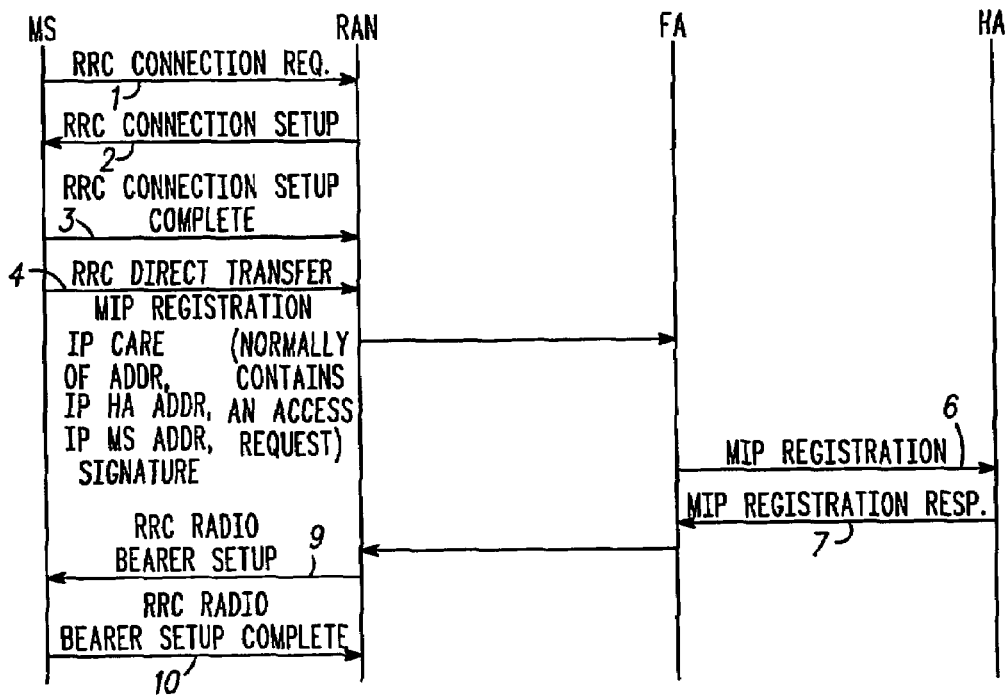
FIG. 5 is a message flow diagram of registration call flow in accordance with the present invention.

FIG. 5 illustrates the registration call flow process. Rather than requesting attachment to the operator's network and performing authentication to receive access, the MS bypasses this function and sends a Mobile IP registration message. FIG. 5 illustrates the registration process proposed in our invention.

Referring to FIG. 5 the following steps are performed for registration:

1. The MS performs a request to access a signaling channel

2. The MS is given signaling channel parameters by the radio network

3. The MS sends some form of acknowledgement

4. The MS transfers signaling information to the radio network—wrapped within this signaling information protocol (in UMTS this protocol is RRC) is the Mobile IP registration message
5. The RRC message is de-capsulated by the radio network and the Mobile IP registration is recognized and routed to the Foreign Agent
6. The Foreign Agent routes the message to the Home Agent for authentication
7. The Home Agent authenticates and sends a response
8. The response is forwarded to the radio network and the radio network sets up its end of a radio bearer channel
9. The radio network sends a radio bearer setup command to the MS
10. The MS responds by setting up its end of the bearer channel and sending an acknowledgement.

1.9. Handoff

Figure 6:
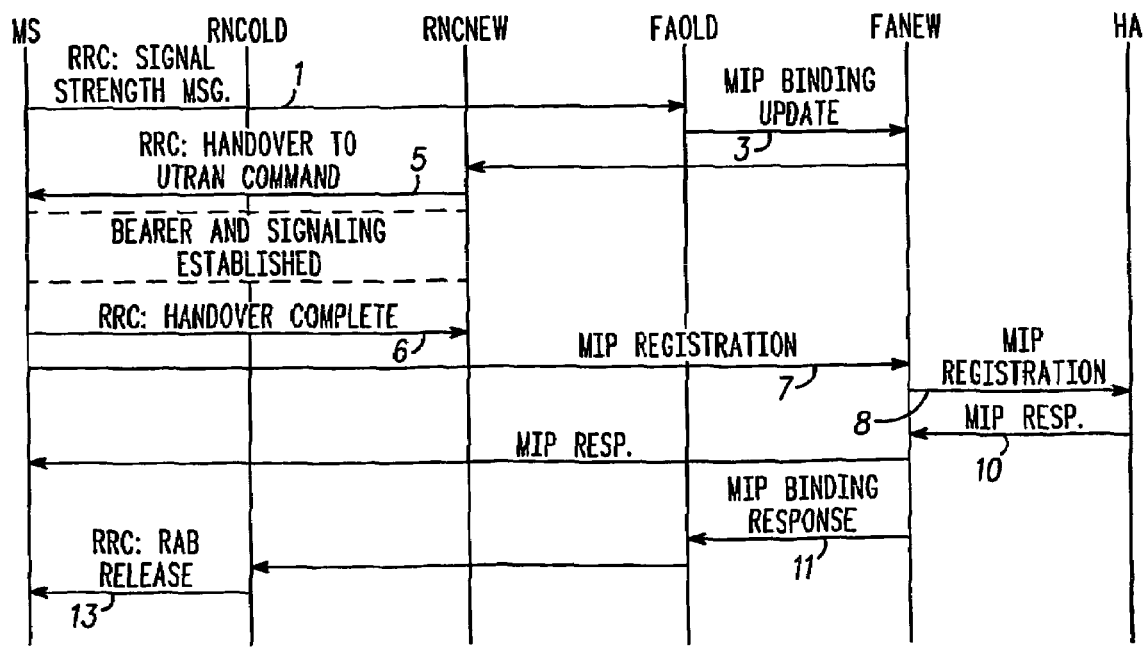
FIG. 6 is a message flow diagram of handoff flow in accordance with the present invention.

FIG. 6 illustrates the Foreign Agent to Foreign Agent handoff process. One example of an approach to handoff assumes a network architecture with one RAN per Foreign Agent. All the handoff procedures shown here are based on the fast handoff concept that is presented by the 3GPP mobile-IP working group in the draft 'draft-calhoun-mobileip-proactive-fa-00.txt "Foreign Agent Assisted Handoff" located on the internet at (http://www.ietf.org/internet-drafts/draft-calhoun-mobileip-proactive-fa-00.txt). Certain link layers, such as those used in cellular networks, allow for the measurement of signal strength, which is typically used to determine when a hand-off is required. The Foreign Agent assisted Hand-off supplies extensions to the Mobile IP protocol, which allow the FA to send an unsolicited message to the Mobile Node, requesting that the Mobile Node register with a new FA. 1.10. Handoff FA to FA FIG. 6 illustrates the Foreign Agent to Foreign Agent Handoff process proposed according to a preferred embodiment of the present invention:

1. The MS continuously measures the signal strength and sends a 'RRC signal strength' message to its old RNC with an indication to which cell it would like to handoff to.
2. The old RNC decides that the cell the mobile wants to hand off to is not in its service area and sends a 'Relocation Required' message to the old FA.
3. The old FA decides that the cell the mobile wants to handoff to is not in its service area and finds, through table look up, the new FA. The old FA then sends out a 'MIP binding update' message to the new FA.
4. The new FA sends a 'Relocation required' message to the new RNC that is serving the cell the mobile needs to hand off to.
5. The new RNC sends a 'RRC: Handover to UTRAN Command' message to the MS setting up the Signaling and Bearer connection from the MS to the new RNC.
6. By setting up the Bearer Connection before the MIP registration takes place (this is a different Sequence than in the 'Registration Call Flow'), the loss of packets is minimized. If the preceding registration request is rejected, the connection will be broken down.
7. The MS sends the 'MIP Registration request' message to the new FA. The FA forwards it to the HA. The 'RRC Direct Transfer' (encapsulating the MIP Registration message) is sent for MS to RNC and 'MIP Registration' message is sent from the RNC to FA and FA to HA (see 'MIP Registration Call Flow' FIG. 5).
8. A 'MIP Registration Response' message is sent back from the HA through the new FA to the new RNC. (see 'MIP Registration Call Flow' FIG. 5).
9. On receipt of the MIP Registration Response' message from the HA the new FA 'it sends a 'MIP binding response' message to the old FA in order to initiate the release of the old resources.
10. The old FA sends a 'RAB release' message to the old RNC
11. The old RNC forwards the 'RRC: RAB release' to MS and both release all old resources.

1.11. Handoff RNC to RNC

One example of an approach to RNC to RNC handoff assumes a fixed (anchor) RNC for the duration of the connection within a particular RAN. In this case, RNC to RNC handoff does generally not apply.

However, it should be appreciated that this invention is not limited to the specific handoff implementation described above. Alternatives may utilize Ericsson's Cellular IP approach, for example, or any distributed mobility management and control approach, that provides local mobility and handoff support in 3G networks. FIG. 7 illustrates the combination of a preferred embodiment of the present invention with Cellular IP to perform local mobility management.

1.12. Local Mobility and Handoff Support when Control is Distributed

Ericsson's Cellular IP whitepaper <draft-ieff-mobileip-cellularip-00.txt> proposes a protocol that allows routing IP datagrams to a Mobile Subscriber can be found on the internet at (http://www.ietf.org/internet-drafts/draft-ietf-mobileip-cellularip-00.txt). The Cellular IP protocol is intended to provide distributed local mobility and handoff support for mobility inside a Radio Access Network. In Cellular IP no local handoff procedures are needed.

Cellular IP Networks may be used as an alternative to Radio Access Networks (RAN). The GWs connect the Cellular IP Networks to an IP backbone, such as the Internet. Base Stations periodically emit beacon signals. MSs use these beacon signals to locate the nearest Base Station. An MS can transmit a packet by relaying it to the nearest Base Station.

Substantially all IP packets transmitted by a Mobile Station are routed from the Base Station to the Gateway (FA) by hop-by-hop shortest path routing, regardless of the destination address.

Cellular IP nodes (RNCs) maintain Route Cache. Packets transmitted by the Mobile Station create and update entries in each node's Cache. An entry maps the Mobile Station's IP address to the neighbor from which the packet arrived to the node.

The chain of cached mappings referring to a single Mobile Station constitutes a reverse path for downlink packets addressed to the same Mobile Station. As the Mobile Station migrates, the chain of mappings always points to its current location because its uplink packets create new and change old mappings. IP packets addressed to a MS are routed by the chain of cached mappings associated with said MS.

MSs that are not actively transmitting or receiving data but want to be reachable for incoming packets let their Route Cache mapping time out but maintain a Paging Cache mapping. Paging Caches will route IP packets addressed to these Mobile Stations. Paging Caches have a longer timeout value than Route Caches and are not necessarily maintained in every node.

Cellular IP works in the preferred embodiment of the present invention as the routing mechanism in the RAN. The radio network controller does not necessary have to be fixed for the duration of the connection. Control is distributed. If the MS hands off to a new Base Station, the mobile IP traffic connection is unaffected. The Foreign Agent doesn't need to be notified until the MS is leaving the Foreign Agent's service boundary. Because the Foreign Agent keeps track of the Base Station/router that passed the last packet originating from this MS, the traffic coming into the Foreign Agent is always able to reach the MS. When the Base Station closest to the MS changes, the path of the packets is backtracked. Thus the Foreign Agent knowing only the last Base Station/router that touched the last MS originated packet is able to route incoming packets to the MS. Preferably, use with a distributed radio control scheme, such as Cellular IP, involves modification of the Foreign Agent to keep a neighbor list (i.e., cache in Cellular IP) that includes the last known controller/device that forward packets to the Foreign Agent.

1.13. Deregistration

Deregistration will happen whenever the mobile leaves one service area and moves into the service area of a different FA or back to the service area of the HA. The steps for this scenario are shown in the FA to FA Handoff Call Flow illustrated in FIG. #6 messages 10 through 13.

1. Whenever the mobile is registered with a new FA and the HA sends back a 'MIP Response' message to the new FA, the new FA will send out a 'MIP binding response' message to the old FA. This message triggers the FA to release all old resources and table entries associated with the MS.
2. The old FA sends out a 'RAB release' message to the old RNC, which in turn triggers the old RNC to release all resources associated with that MS.
3. The old RNC send out a 'RAB Release' message to the MS in order to free all old resources.

1.14. FA on Separate Link

The Foreign Agent is not limited to being on the same link as the radio access network. An IETF draft (draft-ieff-mobileip-3gwireless-ext-02.txt) is being proposed to standardize the signaling between the Foreign Agent and the radio network if they are on separate links. This draft is located at the IETF Internet site at: http://www.ietf.org/internet-drafts/draft-ietf-mobileip-3gwireless-ext-03.txt.

1.15. Technical Summary

From the foregoing, it may be appreciated that industry is moving to an all IP cellular infrastructure that merges wireless mobile services with the Internet. The ISP knows it has to provide mobile packet data services to its subscribers in order to compete with the cellular operators who are now providing Internet access to their customers.

Current solutions however either require the ISP to purchase radio Base Stations and manage a wireless network, or dual provision their subscribers in a cellular operator's HSP as well as in its own ISP subscriber base. Dual provisioning causes the ISP to loose control of its customers and complicates management of the subscriber base. Neither of the prior solutions (i.e., purchase of Base Stations or dual provisioning) is ideal for the ISP. However, the invention as previously described allows the ISP to maintaining control of its subscriber base while providing mobile data services at a low start up cost (only requires the purchase of a Home Agent (HA)).

Further, the previously described invention enables the ISP and cellular operator to work together, rather than compete for subscribers wishing to use data services. This allows ISPs and other IP players to provide mobile packet data services with minimal startup costs. It radically reducing connection setup messages for Mobile IP connections, thus reducing delay. Further, it eliminates dual provisioning of subscribers (enables ISPs to be the sole managers of their subscriber base) and does not require the ISP to purchase wireless equipment (base stations).

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. An arrangement for registering and providing internet access on a mobile station coupled to a radio access network, said arrangement comprising:
   means for encapsulating an internet protocol message within a radio resource control (RRC) message to produce an internet access message, wherein said internet protocol message comprises a mobile internet protocol registration message;
   means for transmitting said internet access message to said radio access network;
   means for un-encapsulating said internet protocol message from said internet access message;
   means for routing said un-encapsulated internet protocol message to an internet agent.

2. The arrangement as claimed in claim 1, wherein said means for encapsulating is located within said mobile station.

3. The arrangement as claims in claim 1, wherein said means for transmitting includes means for transmitting on a radio signal channel between said mobile station and said radio access network.

4. The arrangement as claimed in claim 1, wherein said means for un-encapsulating is located within said radio access network.

5. The arrangement as claimed in claim 1, wherein said internet agent includes a foreign agent.

6. The arrangement as claimed in claim 1, wherein there is further included means for handing off said internet protocol message in response to a command from said internet agent, said means for handing off said internet protocol message being from a first base station to a second base station.

7. The arrangement as claimed in claim 6, wherein said means for handing off includes means for storing a foreign agent neighbor list, the foreign agent neighbor list including at least on foreign agent neighbor and at least one base station associated with said at least one foreign agent neighbor.

8. A method for mobile internet protocol registration via a radio signaling channel of a radio access network, the method comprising the steps of:
   wrapping a mobile internet protocol registration message within a radio control message by a mobile station;
   un-wrapping, by the radio access network, the mobile internet protocol registration message;
   routing the mobile internet protocol registration message to a home agent;
   authenticating, by the home agent, the mobile internet protocol registration message, and
   setting-up a radio bearer channel between the mobile station and the radio access network in response to the authenticating step performed by the home agent.

9. The method as claimed in claim 8, wherein there is further included a step of setting-up a signaling channel between the mobile station and the radio access network.

10. The method as claimed in claim 8, wherein there is further included a step of transmitting the mobile internet protocol registration message within the radio control message from the mobile station to the radio access network.

11. The method as claimed in claim 8, wherein the step of routing includes the steps of:

routing the mobile internet registration message to at least one foreign agent; and routing the mobile internet protocol registration message from the at least one foreign agent to the home agent.

12. The method as claimed in claim 11, wherein there is further included the step of sending a response message from the home agent through the at least one foreign agent to the radio access network.

13. The method as claimed in claim 12, wherein there is further included a step of setting-up a radio bearer channel by the radio access network in response to the response message from the home agent.

14. The method as claimed in claim 13, wherein there is further included a step of setting-up the radio bearer channel by the mobile station, in response to the setting-up of the radio bearer channel by the radio access network.

15. The method as claimed in claim 14, wherein there is further included the step of sending an acknowledgment message from the mobile station to the radio access network for completion of the setting-up of the radio bearer channel.

* * * * *

UNITED STATES PATENT AND TRADEMARK OFFICE
CERTIFICATE OF CORRECTION

| | | |
|---|---|---|
| PATENT NO. | : 7,242,932 B2 | Page 1 of 1 |
| APPLICATION NO. | : 10/258723 | |
| DATED | : July 10, 2007 | |
| INVENTOR(S) | : Wheeler et al. | |

It is certified that error appears in the above-identified patent and that said Letters Patent is hereby corrected as shown below:

Claim 3, line 28, please change "claims" to --claimed--
Claim 7, line 46, please change "on" to --one--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO.         : 7,242,932 B2
APPLICATION NO.    : 10/258723
DATED              : July 10, 2007
INVENTOR(S)        : Wheeler et al.

Page 1 of 1

It is certified that error appears in the above-identified patent and that said Letters Patent is hereby corrected as shown below:

Column 8, Claim 3, line 28, please change "claims" to --claimed--
Column 8, Claim 7, line 46, please change "on" to --one--

This certificate supersedes the Certificate of Correction issued May 13, 2008.

Signed and Sealed this

Third Day of June, 2008

JON W. DUDAS
*Director of the United States Patent and Trademark Office*